United States Patent
Lee et al.

(10) Patent No.: US 8,880,287 B2
(45) Date of Patent: Nov. 4, 2014

(54) STEERING-WHEEL-HOLD DETECTION FOR LANE KEEPING ASSIST FEATURE

(71) Applicant: GM Global Technology Operations LLC, Detroit, MI (US)

(72) Inventors: Jin-Woo Lee, Rochester Hills, MI (US); Bakhtiar Brian Litkouhi, Washington, MI (US); Hsun-Hsuan Huang, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/787,318

(22) Filed: Mar. 6, 2013

(65) Prior Publication Data

US 2014/0257628 A1    Sep. 11, 2014

(51) Int. Cl.
*G06F 19/00*    (2011.01)
*G06F 5/00*     (2006.01)
*B62D 5/04*     (2006.01)

(52) U.S. Cl.
CPC ................................ *B62D 5/0481* (2013.01)
USPC ........................................................ 701/34.4

(58) Field of Classification Search
CPC ..... B60W 10/00; B60W 30/00; B60W 40/00; B60W 2040/00; F02D 41/22
USPC ........................................................ 701/34.4
See application file for complete search history.

(56) References Cited

U.S. PATENT DOCUMENTS

2010/0108432 A1*   5/2010   Okazaki et al. ............... 180/446
2010/0228417 A1*   9/2010   Lee et al. ......................... 701/23

* cited by examiner

*Primary Examiner* — Mary Cheung
*Assistant Examiner* — Anne Mazzara
(74) *Attorney, Agent, or Firm* — John A. Miller; Miller IP Group, PLC

(57) ABSTRACT

A system and method for determining whether a vehicle driver is holding a steering wheel of the vehicle. The vehicle will include an electric power steering (EPS) system and may include an active front steering (AFS) system. The vehicle may further include autonomous or semi-autonomous driving features or safety features, such as Lane Centering Control (LCC) or Lane Keeping Assist (LKA). The system monitors steering torque and steering angle signals, determines a resonant frequency of oscillation of the steering system from the measured data, and compares the resonant frequency to a known natural frequency of the steering system. If the resonant frequency is lower than the known natural frequency, then the system knows that the vehicle driver is holding the steering wheel. A measured steering torque greater than a threshold value is also taken as an immediate indication of the driver holding the steering wheel.

20 Claims, 2 Drawing Sheets

STEERING-WHEEL-HOLD DETECTION FOR LANE KEEPING ASSIST FEATURE

BACKGROUND OF THE INVENTION

1. Field of the Invention

This invention relates generally to a system and method for detecting whether a vehicle driver is holding a steering wheel of the vehicle and, more particularly, to a system and method for determining whether a vehicle driver is holding a steering wheel of the vehicle when the vehicle is in an autonomous, semi-autonomous or manual driving mode by measuring steering torque and steering angle, and using both steering torque and resonant frequency of steering oscillation to determine whether the driver is holding the steering wheel.

2. Description of the Related Art

The automobile industry has been making continuous efforts to enhance the comfort and safety of the occupants of a vehicle, especially the driver. These endeavors have resulted in various technologies, such as advanced driver assistance systems (ADAS) and electronic stability control (ESC) systems. Some of the types of ADAS are adaptive cruise control systems, lane keeping assist systems and lane centering control steering systems. ESC systems, on the other hand, use computerized technologies that improve vehicle handling by detecting and preventing unstable conditions.

Another type of ADAS is an active front steering (AFS) system that adds or subtracts a steering component to the angular movement of the steering wheel in order to reduce the driver effort required to rotate the steering wheel and/or augment the driver steering for improved vehicle safety and stability. The resulting steering angle thus includes the steering input by the driver and the component contributed by the steering system.

The operation of modern vehicles is further becoming more autonomous, i.e., vehicles are able to provide driving control with less driver intervention. Cruise control systems have been on vehicles for a number of years where the vehicle operator can set a particular speed of the vehicle, and the vehicle will maintain that speed without the driver operating the throttle. Adaptive cruise control systems have been recently developed where not only does the system maintain the set speed, but it also will automatically slow the vehicle down in the event that a slower-moving preceding vehicle is detected using various sensors, such as radar and cameras. Certain modern vehicles also provide semi-autonomous parking, where the vehicle will automatically provide the steering control for parking the vehicle. Some vehicle systems intervene if the driver makes harsh steering changes that may affect vehicle stability, while others are designed to maintain the vehicle within a lane or near the center of a lane on the road. Further, fully autonomous vehicles have been demonstrated that can drive in simulated urban traffic up to 30 mph, observing all of the rules of the road.

The systems described above aid the driver by reducing the driving burden. However, it is typically not desirable to reduce the driver's vigilance and attentiveness, even when such systems are providing some or most of the control of the vehicle. It is generally required that the driver keeps his/her hands on the steering wheel, and is ready to take over the steering control whenever the situation demands. Quick and reliable determination of whether the driver's hands are on the steering wheel is needed, whether in a manual steering mode or a system-assisted steering mode.

SUMMARY OF THE INVENTION

In accordance with the teachings of the present invention, a system and method are disclosed for determining whether a vehicle driver is holding a steering wheel of the vehicle. The vehicle will include an electric power steering (EPS) system and may include an active front steering (AFS) system. The vehicle may further include autonomous or semi-autonomous driving features or safety features, such as Lane Centering Control (LCC) or Lane Keeping Assist (LKA). The system monitors steering torque and steering angle signals, determines a resonant frequency of oscillation of the steering system from the measured data, and compares the resonant frequency to a known natural frequency of the steering system. If the resonant frequency is lower than the known natural frequency, then the system knows that the vehicle driver is holding the steering wheel. A measured steering torque greater than a threshold value is also taken as an immediate indication of the driver holding the steering wheel.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining whether a vehicle driver is holding a steering wheel of the vehicle is merely exemplary in nature, and is in no way intended to limit the invention or its applications or uses. For example, the invention described below has particular application for determining whether a vehicle driver is holding a steering wheel of the vehicle when the vehicle includes a Lane Centering Control (LCC) or Lane Keeping Assist (LKA) feature. However, the invention is also applicable to purely manual driving situations, and may also have non-automotive applications.

Figure 1:
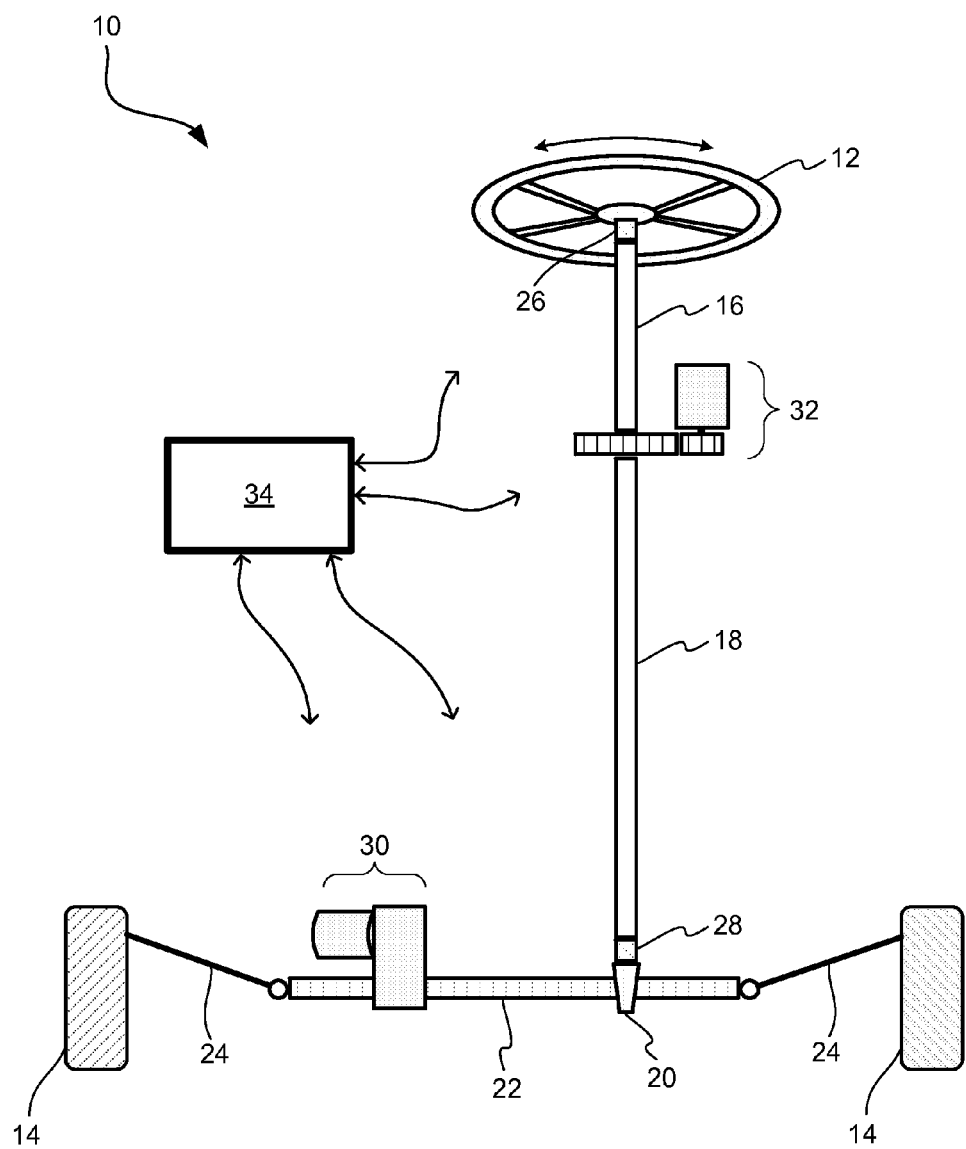
FIG. 1 is a plan view of a vehicle steering system, including sensors and a controller used for determining whether a driver is holding a vehicle steering wheel.

FIG. 1 is a plan view of a vehicle steering system 10 including a steering wheel 12 for steering front wheels 14 of a vehicle. The steering wheel 12 is coupled to the wheels 14 through a main shaft 16 and an intermediate shaft 18, a pinion 20, a steering rack 22, and tie rods 24. As would be understood by those skilled in the art, rotation of the steering wheel 12 causes corresponding rotation of the main shaft 16, the intermediate shaft 18 and the pinion 20. The rotation of the pinion 20 causes a translational movement of the rack 22, which in turn drives the inboard ends of the tie rods 24 laterally, causing a left or right steering motion of the front wheels 14. Other components, such as a universal joint coupling the main shaft 16 to the intermediate shaft 18—not essential to the understanding of the invention —are omitted for clarity.

A steering angle sensor 26 mounted to the main shaft 16 measures the rotation of the steering wheel 12 and the main shaft 16 and provides a steering angle signal indicative of same. A steering torque sensor 28 measures the torque on the intermediate shaft 18 near the pinion 20, and provides a torque signal indicative of same. The positions of the steering angle sensor 26 and the steering torque sensor 28 need not be exactly as shown in FIG. 1; the sensors could be located elsewhere as long as they provide the needed steering angle and steering torque signals.

The steering system 10 includes an electric power steering (EPS) system 30 coupled to the steering rack 22 that provides electric steering assist in response to the vehicle driver turning the steering wheel 12, in a manner that is well understood in the art. In other words, when the vehicle driver turns the steering wheel 12, the EPS system 30 provides an assisting force on the rack 22 so that the steering of the front wheels 14 on the roadway is easier. The vehicle system 10 may also include an active front steering (AFS) system 32 mounted to the intermediate shaft 18. AFS systems are well known to those skilled in the art to provide additional steering, or corrective steering, in various types of vehicle stability control situations, where the AFS system 32 decouples the steering wheel 12 from the front wheels 14.

The steering system 10 also includes a controller 34, in communication with the steering angle sensor 26, the torque sensor 28, the EPS system 30 and (optionally) the AFS system 32. The controller 34 is configured with an algorithm which determines if the driver is holding the steering wheel 12, using input from the sensors 26 and 28 and other known parameters of the steering system 10, according to the following discussion.

As will be discussed in detail below, the present invention provides a technique for determining whether the vehicle driver is holding onto the steering wheel 12. The technique can be applied whether an autonomous or semi-autonomous driving system—such as Lane Centering Control or Lane Keeping Assist —is active or not. A Lane Centering Control (LCC) system attempts to maintain the vehicle in the center of the lane, by making continuous steering adjustments based on the vehicle's position in the lane as determined by sensors. A Lane Keeping Assist (LKA) system attempts to keep the vehicle within the lane, by making a steering correction only if the vehicle is about to depart the lane.

LCC and LKA systems include algorithms which need to know if the driver is holding onto the steering wheel 12, both as a safety precaution, and in anticipation of a steering override by the driver. It is also desirable, for obvious reasons, to know if the driver's hands are not on the steering wheel 12 when the vehicle is not steering itself via LCC or LKA, or when LCC/LKA steering control is to be released. From this motivation, a technique for making sure that the vehicle driver is holding onto the steering wheel 12 is provided. The particular vehicle will include the EPS system 30, but may or may not include the AFS system 32, where the technique described below for determining if the vehicle driver is holding the steering wheel 12 will operate the same for either vehicle.

In general terms, the technique for determining if the driver is holding onto the steering wheel 12 includes measuring a resonant frequency of oscillation in the steering system 10, and comparing the resonant frequency to a known natural frequency of oscillation of the steering system 10 itself. The natural frequency is known based on physical parameters of the system 10, such as mass, inertia, stiffness and damping. If the observed resonant frequency is near the known natural frequency, it can be concluded that the driver's hands are not on the steering wheel 12. If, however, the observed resonant frequency is much lower than the known natural frequency, then it can be concluded that the driver's hand(s) are on the steering wheel 12, causing an increase in the effective moment of inertia of the steering wheel 12 and an accompanying decrease in the resonant frequency. The observed resonant frequency can be obtained from either the steering torque data, the steering angle data, or both.

The steering system 10 is approximated using a $2^{nd}$ order model, as follows:

$$(I_{str}+I_{drv})\ddot{\delta}+c_{str}\dot{\delta}+k_{str}\delta=\tau_{drv}+\tau_{self-align}+\tau_{eng-vib} \quad (1)$$

Where $\delta$ is steering angle (measured at the steering angle sensor 26), $I_{str}$ is the moment of inertia of the steering system 10 (known), $c_{str}$ is the damping coefficient of the steering system 10 (known), $k_{str}$ is the rotational stiffness of the steering system 10 (known), $\tau_{drv}$ is the driver-applied torque on the steering wheel 12 (measured at the torque sensor 28), $\tau_{EPS}$ is the steering torque from the EPS 30 (a known command), $\tau_{self-align}$ is the self-aligning torque in the steering system 10 (estimated), and $\tau_{eng-vib}$ is an engine vibration disturbance applied to the system 10 (affecting everything in the engine compartment, and including a wide range of frequencies). $I_{drv}$ is the moment of inertia added by the driver's hands on the steering wheel 12, which is unknown. It has been observed that $I_{drv}$ can vary from a relatively large value when the driver has both hands firmly gripping the steering wheel 12, to a smaller value when only one hand is lightly gripping the steering wheel 12, to a virtually undetectable value when the driver just has a finger lightly touching the steering wheel 12.

Other than the engine vibration disturbance, $I_{drv}$ is the only unknown in Equation (1). Other hands-on-the-wheel detection systems attempt to directly estimate $I_{drv}$, but this approach is sensitive to noise in the steering angle, and ignores the engine vibration disturbance. Rather than trying to directly estimate $I_{drv}$, the technique presented here measures the frequency response of the steering system 10, and uses this information to determine whether a significant amount of additional inertia ($I_{drv}$) has been added to the system 10.

From first principles of second order dynamic mechanical systems, the undamped natural frequency of the system 10 described in Equation (1) is:

$$\omega_n = \sqrt{\frac{k_{str}}{(I_{str}+I_{drv})}} \quad (2)$$

Where $\omega_n$ is the undamped natural frequency of the steering system 10, and the other variables were defined above.

Similarly, the damped natural frequency, or resonant frequency, of the system 10 can be defined as $$\omega_r = \omega_n \sqrt{1-2\cdot\zeta^2} \quad (3)$$

Where $\omega_r$ is the resonant frequency of the steering system 10, $\omega_n$ was defined in Equation (2), and $\zeta$ is the damping factor of the system 10, which in turn is defined as:

$$\zeta = \frac{c_{str}}{2\sqrt{(I_{str}+I_{drv})\cdot k_{str}}} \quad (4)$$

As mentioned above, the inherent inertia, stiffness and damping characteristics of the steering system 10 are known by the vehicle manufacturer. For example, in a common passenger car or light sport-utility vehicle (SUV), the steering system stiffness, $k_{str}$, is around 2.0 N–m/deg, where most of the compliance is contributed by the intermediate shaft 18. In the same vehicles, the steering system inertia, $I_{str}$, is around 0.05 kg–m², where most of the inertia is contributed by the steering wheel 12. Steering system damping is targeted at a value of $c_{str}$ which provides critical damping—that is, where $\zeta=0.5$.

Using the stiffness, inertia and damping values listed above, the resonant frequency of the steering system 10 with no inertia added by the driver's hands (that is, $I_{drv}=0$) is calculated to be around 14 Hz. Other types of vehicles may have a higher or lower steering system resonant frequency. Knowing this fundamental property of the steering system 10, an algorithm can be designed to detect the actual resonant frequency of vibration of the steering system 10, and compare the actual resonant frequency to the hands-off resonant frequency. If the actual resonant frequency is significantly lower than hands-off resonant frequency—around 3 Hz, for example—this is an indication that inertia has been added to the steering wheel 12 by the driver's hands, meaning that one or both hands are on the steering wheel 12.

Both the hands-off resonant frequency and the hands-on resonant frequency, for a particular vehicle type, can be experimentally measured on a test vehicle, and the respective frequencies can then be used in the method discussed below. Alternatively, the hands-off resonant frequency and the hands-on resonant frequency can be estimated, for a particular vehicle type, using Equations (2)-(4) and the known stiffness, mass and damping properties of the steering system 10.

The technique described above provides several advantages over existing systems for detecting a driver's hands on the steering wheel. These advantages include the ability to detect a driver's hands on/off the wheel both during manual driving and during LCC/LKA active driving, the ability to detect a driver steering override intention while LCC/LKA are active, the ability to immediately detect a hands-on situation, quicker detection of hands-off than the prior art, and the need for no additional hardware on the vehicle.

Figure 2:
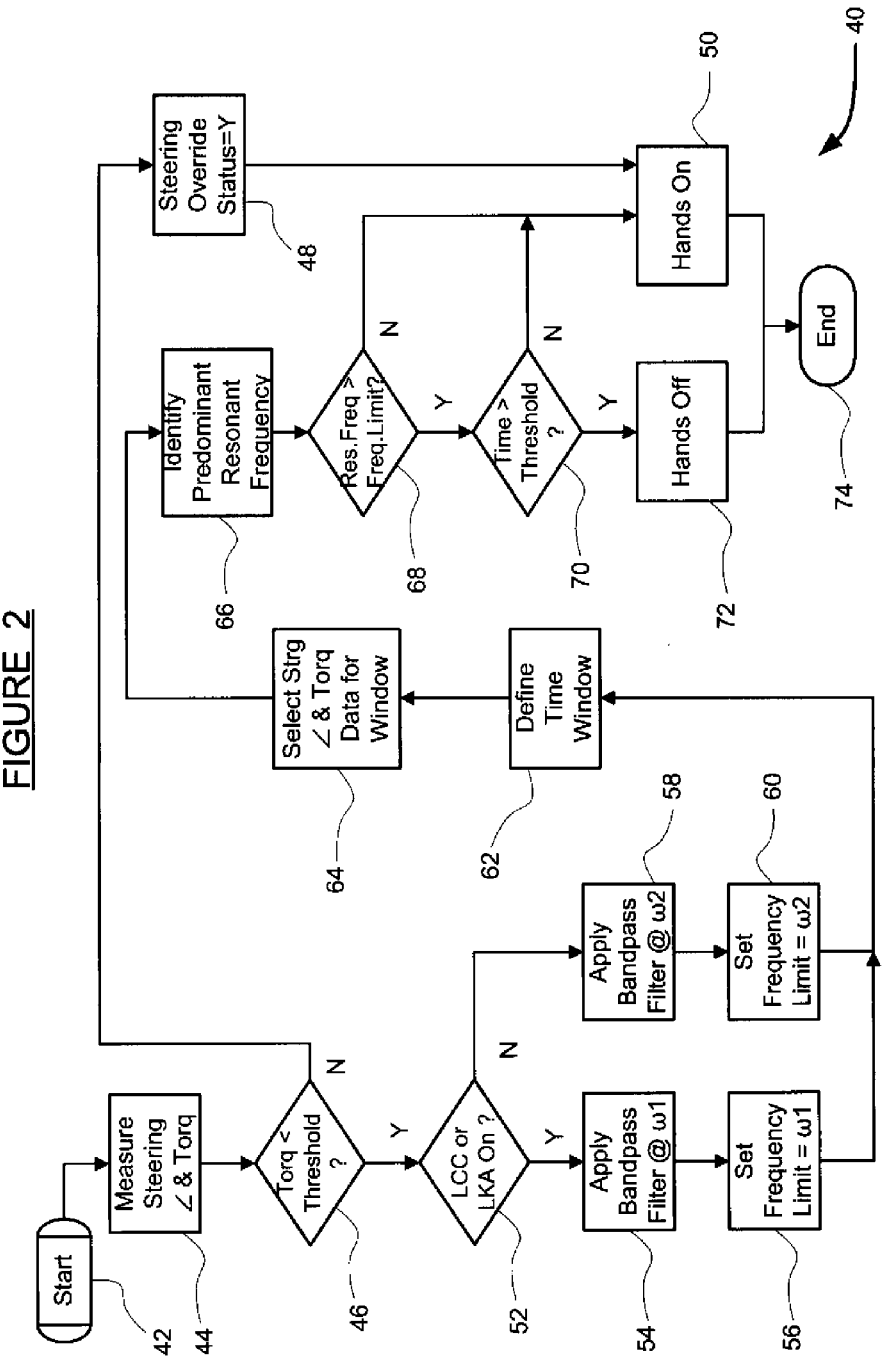
FIG. 2 is a flowchart diagram of a method for determining whether the driver is holding the vehicle steering wheel by comparing a measured resonant frequency to a known natural frequency.

FIG. 2 is a flowchart diagram 40 of a method for detecting whether the vehicle driver is holding onto the steering wheel 12 in the manner discussed above. In a preferred embodiment, the method of the flowchart diagram 40 is programmed in an algorithm which runs on the controller 34. The controller 34 is a device including at least a microprocessor and a memory module, where the microprocessor is configured to run the hands-on/off detection algorithm, and the memory is used to store sensor readings and other data, as would be understood by one skilled in the art.

The method begins at start oval 42. At box 44, steering angle and steering torque data are provided from the steering angle sensor 26 and the steering torque sensor 28, respectively. At decision diamond 46, it is determined whether the steering torque is less than a predefined torque threshold, where a torque value above the torque threshold indicates a clear driver steering effort. If the steering torque is not less than the torque threshold, then at box 48 a steering override status is set equal to Yes, and at box 50 the hands-on/off status is set to Hands On. The steering override status from the box 48 is used by LCC/LKA systems, which modify their behavior when the driver is clearly steering the vehicle himself/herself and/or trying to override the LCC/LKA system.

If the steering torque is less than the torque threshold at the decision diamond 46, then at decision diamond 52 it is determined whether an LCC or LKA system is on. If an LCC or LKA system is on, then at box 54 a band-pass filter at a first frequency value is applied to the steering angle data and the steering torque data, and at box 56 a frequency limit is set equal to the first frequency value. If an LCC or LKA system is not on, or not available, then at box 58 a band-pass filter at a second frequency value is applied to the steering angle data and the steering torque data, and at box 60 the frequency limit is set equal to the second frequency value. The purpose of the branching to either boxes 54/56 or boxes 58/60 is to optimize the performance of the algorithm based on the expected data. Specifically, if an LCC system is on, it is more likely that the driver's hands are off the steering wheel 12, and the observed resonant frequency will be that of the steering system 10 itself. In this case, the band-pass filter and the frequency limit can be set to a first frequency value around 14 Hz. This value will not be exactly 14 Hz for all vehicles, and can range at least from 13-15 Hz. On the other hand, if an LCC or LKA system is not on, it is much more likely that the driver's hands are on the steering wheel 12, and the observed resonant frequency will be affected by the driver's hands. In this case, the band-pass filter and the frequency limit can be set to a second frequency value around 3 Hz (+/−1), which is the expected response in a hands-on situation.

At box 62, a time window for steering angle data and steering torque data is defined. The time window could be, for example, about 2.5 seconds. Longer or shorter time windows could also be used. The intention of the time window is to analyze a data sample which is long enough to provide good resonant frequency analysis, but not so long as to be affected by earlier driver actions which are no longer applicable. At box 64, sensor data from the steering angle sensor 26 and the steering torque sensor 28 are selected for the time window. At box 66, a predominant resonant frequency is identified by analyzing either the steering angle data or the steering torque data, or both, within the time window. The resonant frequency being experienced by the steering system 10 will appear in both the steering angle data and the steering torque data, and thus, either or both can be analyzed.

Any applicable method of identifying a resonant frequency in time-history data may be used at the box 66. For example, a Fast Fourier Transform (FFT), such as a 256-point FFT, may be used. Alternatively, the number of peaks in the data in the time window can be counted, and the number of peaks can be used to determine the resonant frequency. Other methods may also be used. Regardless of what frequency identification method is used, the actual resonant frequency is identified at the box 66.

At decision diamond 68, it is determined whether the actual resonant frequency from the box 66 is greater than the frequency limit which was set at the box 56 or 60. If the actual resonant frequency is greater than the frequency limit, then a hands-off situation is possible, and at decision diamond 70 it is determined whether the actual resonant frequency has been greater than the frequency limit for a time period greater than or equal to a predefined time threshold. The time threshold, such as 5 seconds, is defined to ensure that enough data is analyzed to provide high confidence in a hands-off determination. If the actual resonant frequency has been greater than the frequency limit for a time period greater than or equal to the predefined time threshold, then at box 72 the hands-on/off status is set to Hands Off.

If actual resonant frequency is not greater than the frequency limit at the decision diamond 68, or if the actual resonant frequency has been greater than the frequency limit only for a time period less than the predefined time threshold at the decision diamond 70, then at the box 50 the hands-on/off status is set to Hands On. After the hands-on/off status is set to either Hands On at the box 50 or Hands Off at the box 72, the process ends at terminus 74. Of course, the process actually runs continuously during vehicle operation.

The knowledge of hands-on or hands-off-the-wheel status is important in the implementation of lane centering or lane keeping systems, and is equally important in unassisted, manual driving. The method and system discussed above provide reliable detection of driver hands-on or hands-off status in a vehicle, including immediate detection of hands-on and driver steering override intention, and rapid detection of a hands-off situation. The method and system are effective in both LCC/LKA-assisted and manual driving situations.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining whether a vehicle driver is holding onto a vehicle steering wheel, said method comprising:
   providing steering torque data from a steering torque sensor and steering angle data from a steering angle sensor;
   applying a band-pass filter at a first specified frequency to the steering angle data and the steering torque data;
   setting a frequency limit equal to the first specified frequency;
   selecting the steering angle data and the steering torque data for a time window of a predefined duration;
   identifying, using a microprocessor, a resonant frequency in the steering angle data or the steering torque data for the time window; and
   determining that the vehicle driver is not holding onto the vehicle steering wheel only if the identified resonant frequency remains greater than the frequency limit for a predefined time period.

2. The method of claim 1 further comprising comparing a steering torque value to a steering torque threshold and, if the steering torque value is greater than or equal to the steering torque threshold, setting a steering override value equal to yes and determining that the vehicle driver is holding onto the vehicle steering wheel.

3. The method of claim 1 wherein the first specified frequency is equal to a known steering system resonant frequency with the driver not holding onto the vehicle steering wheel.

4. The method of claim 3 wherein the first specified frequency is determined from measurements taken on a test vehicle.

5. The method of claim 1 further comprising determining if a lane keeping or lane centering system is active in the vehicle, and applying the band-pass filter at a second specified frequency to the steering angle data and the steering torque data and setting the frequency limit equal to the second specified frequency if the lane keeping or lane centering system is not active.

6. The method of claim 5 wherein the second specified frequency is equal to an expected steering system resonant frequency with the driver holding onto the vehicle steering wheel.

7. The method of claim 6 wherein the second specified frequency is determined from measurements taken on a test vehicle with a test driver.

8. The method of claim 1 wherein identifying a resonant frequency in the steering angle data or the steering torque data for the time window includes using a Fast Fourier Transform (FFT) technique.

9. The method of claim 1 wherein identifying a resonant frequency in the steering angle data or the steering torque data for the time window includes counting a number of peaks in the steering angle data or the steering torque data and using the number of peaks to determine the resonant frequency.

10. The method of claim 1 wherein the predefined time period is less than 10 seconds.

11. A method for determining whether a vehicle driver is holding onto a vehicle steering wheel, said method comprising:
   providing steering torque data from a steering torque sensor and steering angle data from a steering angle sensor;
   comparing a steering torque value to a steering torque threshold;
   setting a steering override value equal to yes and determining that the vehicle driver is holding onto the vehicle steering wheel if the steering torque value is greater than or equal to the steering torque threshold;
   determining if a lane keeping or lane centering system is active in the vehicle;
   applying a band-pass filter at a first specified frequency to the steering angle data and the steering torque data and setting a frequency limit to the first specified frequency if the lane keeping or lane centering system is active, where the first specified frequency is equal to a known steering system resonant frequency with the driver not holding onto the vehicle steering wheel;
   applying a band-pass filter at a second specified frequency to the steering angle data and the steering torque data and setting a frequency limit to the second specified frequency if the lane keeping or lane centering system is not active, where the second specified frequency is equal to an expected steering system resonant frequency with the driver holding onto the vehicle steering wheel;
   selecting the steering angle data and the steering torque data for a time window of a predefined duration;
   identifying, using a microprocessor, a resonant frequency in the steering angle data or the steering torque data for the time window; and
   determining that the vehicle driver is not holding onto the vehicle steering wheel only if the identified resonant frequency remains greater than the frequency limit for a predefined time period.

12. The method of claim 11 wherein identifying a resonant frequency in the steering angle data or the steering torque data for the time window includes using a Fast Fourier Transform (FFT) technique.

13. The method of claim 11 wherein identifying a resonant frequency in the steering angle data or the steering torque data for the time window includes counting a number of peaks in the steering angle data or the steering torque data and using the number of peaks to determine the resonant frequency.

14. The method of claim 11 wherein identifying a resonant frequency includes identifying the resonant frequency in both the steering angle data and the steering torque data for the time window.

15. A system for determining whether a vehicle driver is holding onto a vehicle steering wheel, said system comprising:
   a steering angle sensor for providing steering angle data for a steering system;
   a steering torque sensor for providing steering torque data for the steering system; and
   a controller comprising a processor and a memory module, said controller being configured to determine whether the driver is holding onto the steering wheel by applying a band-pass filter at a first specified frequency to the steering angle data and the steering torque data, setting a frequency limit equal to the first specified frequency, selecting the steering angle data and the steering torque data for a time window of a predefined duration, identifying a resonant frequency in the steering angle data or the steering torque data for the time window, and determining that the vehicle driver is not holding onto the vehicle steering wheel only if the identified resonant frequency remains greater than the frequency limit for a predefined time period.

16. The system of claim 15 wherein the controller is also configured to compare a steering torque value to a steering torque threshold and, if the steering torque value is greater than or equal to the steering torque threshold, set a steering override value equal to yes and determine that the vehicle driver is holding onto the vehicle steering wheel.

17. The system of claim 15 wherein the controller is also configured to determine if a lane keeping or lane centering system is active in the vehicle, and apply the band-pass filter at a second specified frequency to the steering angle data and the steering torque data and set the frequency limit equal to the second specified frequency if the lane keeping or lane centering system is not active.

18. The system of claim 17 wherein the first specified frequency is equal to a known steering system resonant frequency with the driver not holding onto the vehicle steering wheel, and the second specified frequency is equal to an expected steering system resonant frequency with the driver holding onto the vehicle steering wheel.

19. The system of claim 15 wherein identifying a resonant frequency in the steering angle data or the steering torque data for the time window includes using a Fast Fourier Transform (FFT) technique.

20. The system of claim 15 wherein identifying a resonant frequency in the steering angle data or the steering torque data for the time window includes counting a number of peaks in the steering angle data or the steering torque data and using the number of peaks to determine the resonant frequency.

* * * * *